B. F. CRAMER.
MEANS FOR ADJUSTING OVEN SHELVES.
APPLICATION FILED MAY 8, 1909. RENEWED DEC. 15, 1910.
999,633.
Patented Aug. 1, 1911.
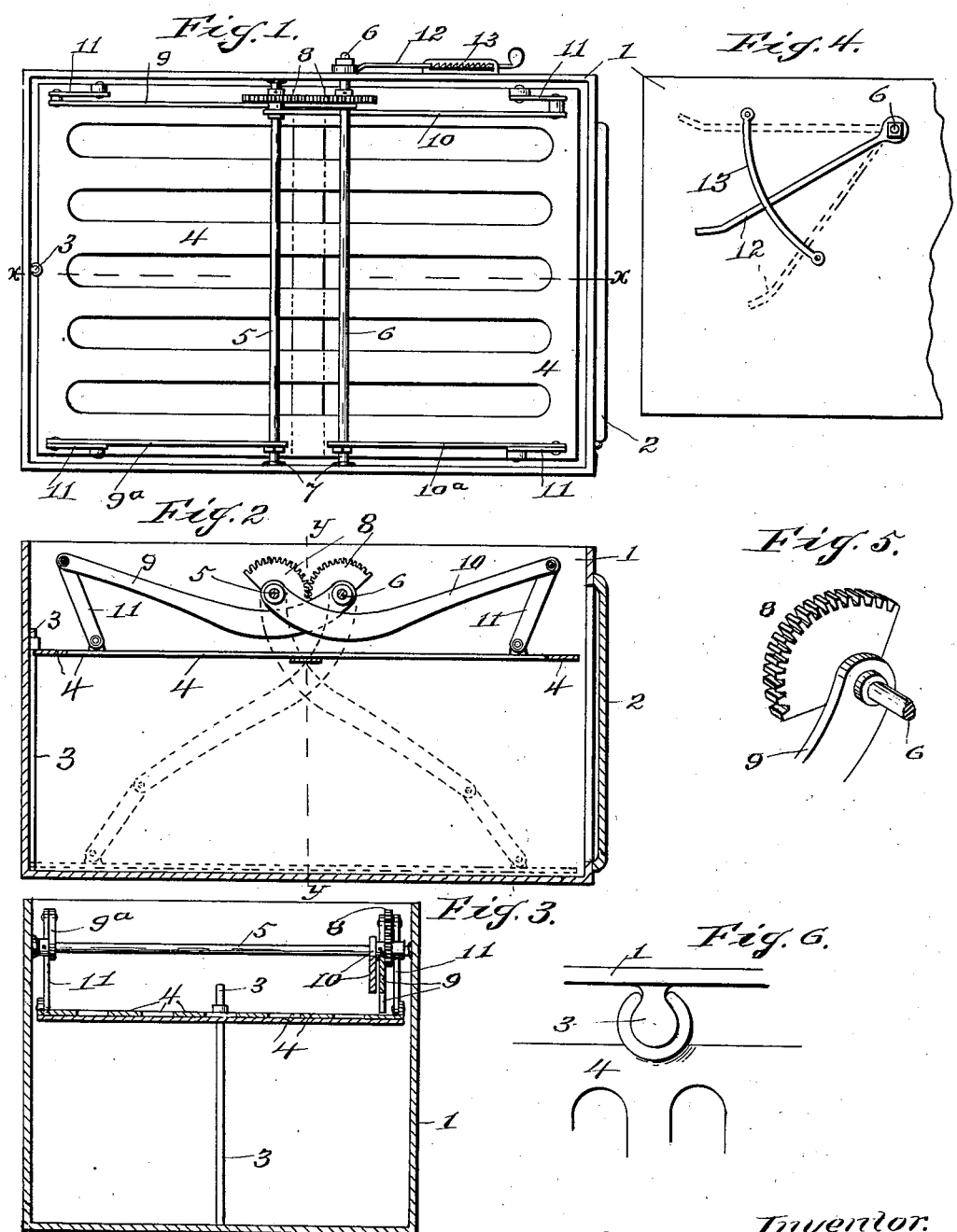
Inventor.
Benjamin F. Cramer
Witnesses.

UNITED STATES PATENT OFFICE.

BENJAMIN F. CRAMER, OF SALT LAKE CITY, UTAH.

MEANS FOR ADJUSTING OVEN-SHELVES.

999,633.

Specification of Letters Patent.

Patented Aug. 1, 1911.

Application filed May 8, 1909, Serial No. 494,853. Renewed December 15, 1910. Serial No. 597,552.

*To all whom it may concern:*

Be it known that I, BENJAMIN F. CRAMER, a citizen of the United States, residing at Salt Lake City, in the county of Salt Lake and State of Utah, have invented certain new and useful Improvements in Means for Adjusting Oven-Shelves, of which the following is a specification.

This invention relates to the class of stoves and furnaces, and pertains especially to cooking ovens for stoves and ranges.

The object of the invention is to provide novel and peculiar means for operating oven shelves, so as to raise and lower the shelf and to hold it in such adjusted position as may be desired or as occasion may demand.

A further object of the invention is to provide, in an oven shelf adjuster, a pair of shafts each having a toothed segment meshing one with the other, and a series of levers and links connecting the shafts with such shelf for operating it.

Other objects, advantages and improved results will be disclosed in the specification and claims to follow, and in the practical application of the invention.

In the accompanying drawings forming part of this application: Figure 1 is a top view of an oven with its top removed showing the application of the invention. Fig. 2 is a sectional view on the line $x$—$x$, Fig. 1, showing movable position of the parts in dotted lines. Fig. 3 is a sectional view on the line $y$—$y$, Fig. 2. Fig. 4 is a side view of part of the oven. Fig. 5 is a detail perspective view of the segment, end of one of the shafts and part of its lever. Fig. 6 is a detail view of the guide rod and oven shelf partly broken away.

The same reference numerals denote the same parts throughout the several views of the drawings.

Certain devices for operating oven shelves employ plate-springs, coil-springs and other elements affected by heat, but it is highly important that such devices and the parts thereof be such as will not be affected in their operation by the heat of an oven or its range, especially where such devices are located within the oven, hence it is the purpose of my invention to furnish a device the working of which will not be affected by heat in raising and lowering oven shelves.

The oven 1 has the usual hinged door 2, and may be of any desired shape or size, and the inner face of the rear end of the oven is provided with a guide rib or rod 3, for the oven shelf 4.

The device or means for operating the oven shelves comprises two shafts 5 and 6, arranged parallel across the oven under its top, and adapted to be turned in sockets 7, on the inner face of the sides of the oven, a pair of toothed segments 8, one of which is fixed to one end of each shaft within the oven, levers 9 and 10 are fixed respectively to the shafts 5 and 6 adjacent the segments, and levers 9$^a$ and 10$^a$ are fixed to the other end of the shafts, and links 11 pivotally connect the levers with the oven shelf. One end of the shaft 6 extends through the side of the oven and is provided with a lever 12, adapted to be operated by hand or foot for imparting motion to the shaft 6. A suitable toothed rack 13 is provided for holding the lever 12 in such position as it may be placed. It is obvious that the lever 13 has simply to be moved to operate the shafts and their segments, which operate the levers 9 and 10, and the links 11, in raising and lowering the shelf.

It will be seen by reference to Fig. 2 that the levers of each pair are crossed at various points during the operation of raising and lowering the shelf, and that each link 11 is in alinement with its lever and forms an extension of its lever when the shelf is lowered to the bottom of the oven.

It will be observed that the shelf may be raised to give a greater oven space below the shelf, and that when the shelf is in its lowest position the full oven space is available.

Having thus described my invention what I claim as new and desire to secure by Letters Patent is:

1. The combination, with an oven, and a vertically slidable oven shelf, of a pair of shafts journaled in the sides of the oven, a toothed segment carried by each shaft within the oven and above the shelf and meshing one with the other, levers and links connecting the shafts with the shelf and operated above the shelf for sliding the latter, and means for operating the shafts.

2. The combination, with an oven having a vertical guide-rod or rib, and a shelf slidable on said guide, of a pair of parallel shafts extending across and journaled in the sides of the oven, levers extending from the shafts in opposite directions and certain of said levers crossing each other under the shafts, means for connecting the levers with the shelf for sliding it, a toothed segment on each shaft and meshing one with the other for automatically operating all the levers, and means for imparting motion to one of said shafts.

3. The combination, with an oven, and a vertically slidable oven shelf, of a pair of shafts journaled in the oven, a pair of levers one of which is secured to each shaft and working loosely across each other, links connecting the levers with the oven shelf, a pair of toothed segments one of which is secured to each shaft and meshing with the other, and means for operating the shafts to slide the shelf.

In witness whereof I hereunto set my hand in the presence of two witnesses.

BENJAMIN F. CRAMER.

Witnesses:
A. C. SADLER,
Mrs. L. POULSEN.